(12) United States Patent
Catalan et al.

(10) Patent No.: US 6,810,796 B2
(45) Date of Patent: Nov. 2, 2004

(54) METHOD FOR PRODUCING AND DISTRIBUTING PROMOTIONAL IMAGES

(75) Inventors: Jose Luis Catalan, Rio de Janeiro (BR); Ricardo Vazquez, Buenos Aires (AR)

(73) Assignee: José Luis Catalán, Buenos Aires (AR)

( * ) Notice: Subject to any disclaimer, the term of this patent is extended or adjusted under 35 U.S.C. 154(b) by 0 days.

(21) Appl. No.: 10/215,750

(22) Filed: Aug. 9, 2002

(65) Prior Publication Data

US 2003/0221567 A1 Dec. 4, 2003

Related U.S. Application Data

(60) Provisional application No. 60/384,492, filed on May 31, 2002.

(51) Int. Cl.[7] ............................................... B41F 17/00
(52) U.S. Cl. ........................... 101/41; 101/44; 209/643; 426/383; 414/798.4
(58) Field of Search ............................. 101/35, 41–44, 101/483, 485, 486, 492, 163; 414/781–783, 798.4, 798.9; 209/643, 701; 426/383, 87

(56) References Cited

U.S. PATENT DOCUMENTS

| | | | |
|---|---|---|---|
| 1,611,679 A | 12/1926 | Rees | |
| 1,906,094 A | 4/1933 | Powell | |
| 3,094,920 A | 6/1963 | Priesmeyer | |
| 3,389,654 A | 6/1968 | Hirt | |
| 3,779,159 A | 12/1973 | Rose et al. | |
| 3,848,564 A | 11/1974 | Kull | |
| 4,355,936 A | * 10/1982 | Thomas et al. | 414/796.2 |
| 4,411,574 A | * 10/1983 | Riley | 414/796.3 |
| 4,531,475 A | 7/1985 | Thill | |
| 4,843,958 A | * 7/1989 | Egosi | 101/2 |
| 4,967,687 A | 11/1990 | McShane | |
| 5,063,871 A | 11/1991 | Chambers | |
| 5,142,976 A | * 9/1992 | Roulleau | 101/41 |
| 5,164,009 A | 11/1992 | Chandler | |
| 5,565,229 A | 10/1996 | Mandle | |
| 5,693,352 A | 12/1997 | Vogel Goodman | |
| 5,895,679 A | 4/1999 | Pender et al. | |
| 6,419,089 B1 | * 7/2002 | Dall | 206/521.1 |
| 2002/0011311 A1 | * 1/2002 | Carignan et al. | 156/350 |
| 2002/0150460 A1 | * 10/2002 | Chalker et al. | 414/781 |

FOREIGN PATENT DOCUMENTS

| | | | | |
|---|---|---|---|---|
| DE | 3516016 A1 | * 11/1986 | | G09F/23/00 |
| DE | 3836142 A1 | * 4/1990 | | B41F/17/00 |
| EP | 0 442 782 A1 | 8/1991 | | B41F/17/330 |

* cited by examiner

Primary Examiner—Ren Yan
(74) Attorney, Agent, or Firm—Robert A. Seldon

(57) ABSTRACT

This invention relates to a method and apparatus for distributing mass copies of text and/or images on a novel medium, namely eggs, by using the eggshell of the egg as an advertising or message-bearing medium. Mass quantities of eggs are imprinted with a promotional image prior to distributing said eggs to consumers. The promotional image can be, for example, a corporate logo, a national flags, a charitable insignias, a messages or a trademark and can be multi-colored. A matrix of eggs are preferably imprinted by a like matrix of printing tampons. The eggs are preferably lifted and oriented by a like matrix of vacuum heads.

13 Claims, 2 Drawing Sheets

METHOD FOR PRODUCING AND DISTRIBUTING PROMOTIONAL IMAGES

Figure 1:
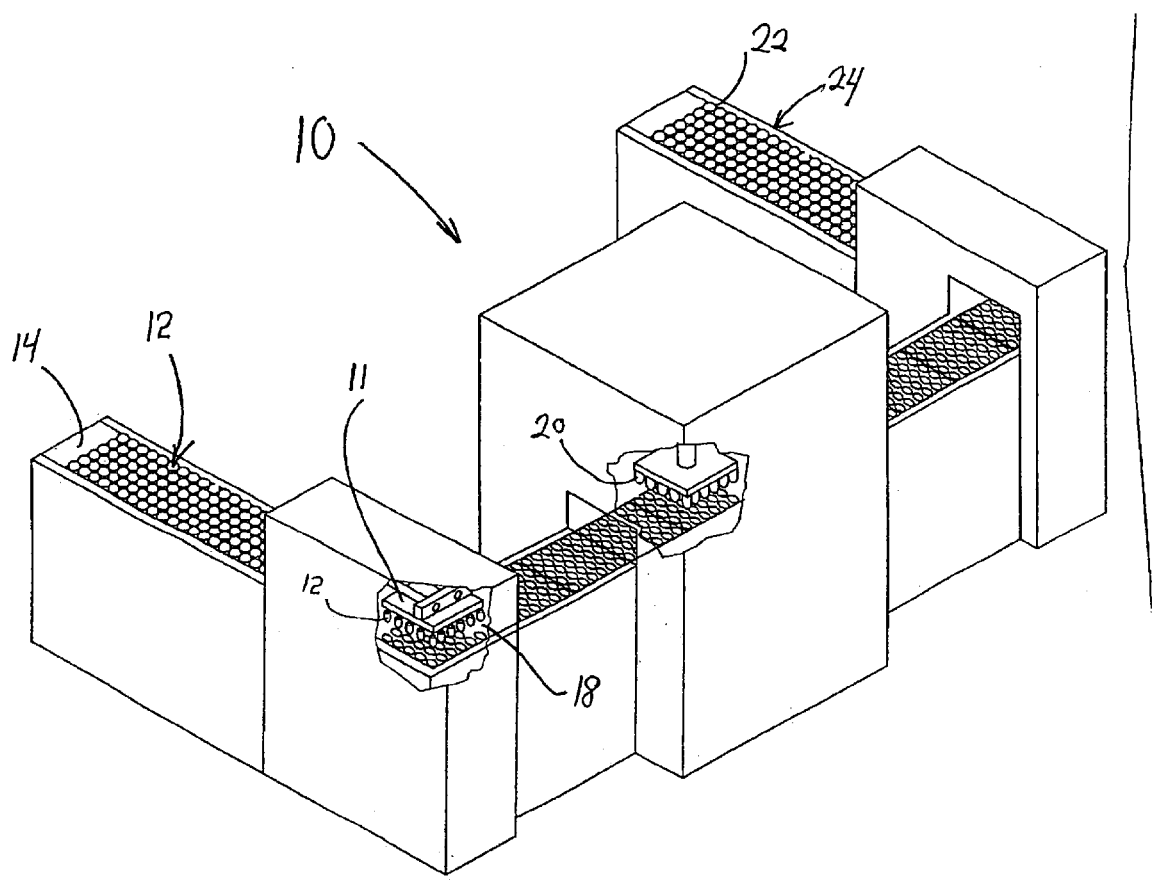

This application claims the benefit of provisional application No. 60/384,492 filed May 31, 2002.

This invention relates to a method and apparatus for distributing mass copies of text and/or images on a novel medium; namely, eggs. This invention further related to using the eggshell of the egg as an advertising or message-bearing medium. This invention further relates to a method and apparatus for imprinting images on eggs prior to sale and/or distribution to the consumer.

BACKGROUND

Eggs are an ever-present, universally accepted staple that is found in virtually every household. The ability to mass-produce messages and/or images on the shells of the eggs represents a unique and heretofore unexploited opportunity to communicate with countless numbers of people. As will become apparent, the communicated information can be, for example, the name and/or logo of the egg producer, or of the store from which the eggs are purchased, or of a third party paying to advertise on the eggshell. In addition, the name and/or flag of the country which is the source of the egg can be imprinted on the egg for political, economic or charitable identification. Naturally, limitless other texts and/or images can be printed, including but not limited to cartoon characters, images of famous people, recreated works of art and other such indicia, instructions, warnings, and communications pertaining to the egg or to matters other than the egg. Of course, combinations of more than one of the foregoing can be printed on different portions of the eggs. Regardless of the format, the eggshell becomes a novel medium for mass communication. All of the foregoing types of graphic and informational images and texts are hereinafter referred to as "promotional images" regardless of whether the motive for imprinting the eggs is political, commercial, informational, instructional, charitable, promotional, etc.

In accordance with the invention, eggs are preferably positioned on moving conveyor are and manipulated to position the desired region or regions of the eggshell for imprinting contact by an image-bearing tampon. Multi-color images can be produced by sequentially contacting the eggs with a plurality of tampons. Numerous other printing methods may also be employed, as hereinafter described, without departing from the spirit of the invention.

These and other features of the invention will become apparent in the following description of the preferred embodiment of which the drawings form a part.

IN THE DRAWINGS

Figure 2:
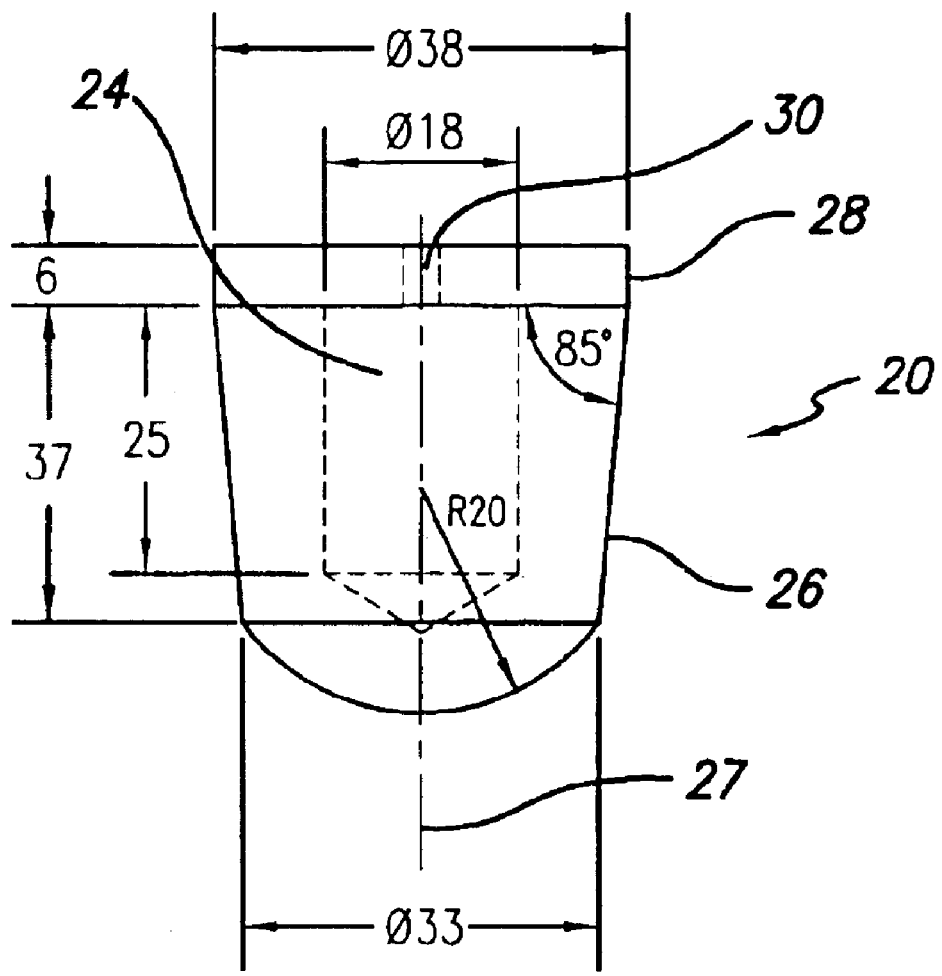

FIG. 1 is an isometric view in schematic of a preferred machine for carrying out the process of mass producing such imprinted eggs in accordance with the invention; and FIG. 2 is a longitudinal sectional view of a preferred tampon used by the machine in FIG. 1 in accordance with the invention.

DESCRIPTION OF THE PREFERRED EMBODIMENT

Referring to FIG. 1, a machine 10 is illustrated, into which eggs 12 are transported via a conveyor 14. As will be described, the machine is preferably configured to print a full color logo or image on an egg at a preferred rate of approximately 21,000 eggs per hour, making the egg shell a novel mass-producible advertisement-bearing medium.

The machine 10 is positioned to process the eggs as they exit from the classifier (not shown) at an egg-packing facility. The classifier is a known device that separates eggs by size into one of several standard sizes: e.g., large, extra large, jumbo. Accordingly, eggs entering the machine 10 have generally equivalent diameters and curvatures.

The eggs 12 typically exit from the classifier in a series of 5×6 matrices. Each of the 30 compartments forming the 5×6 matrix is of a shape and structure similar to those of the commonly-encountered egg carton, holding the contained egg in a generally vertical orientation: i.e., with its longitudinal axis generally vertical.

As each row of 6 eggs enters the machine 10, the conveyor stops momentarily to permit each of the six eggs to be manually or automatically lifted and manipulated into position for contact by a respective tampon 20. The preferred automatic manipulation utilizes a vacuum manifold 11 having 6 vacuum heads to lift and manipulate the eggs. Each vacuum head has a plurality of orifices through which a partial vacuum is drawn so as to secure the egg against the head. Preferably, each head accommodates the top contour of the egg, so as to encircle the egg about an upper region. The orifices are evenly distributed about the circumference of the egg along said upper region so that the egg is gently secured to the head with substantially evenly distributed pressure, enabling the egg to be spatially manipulated without cracking the shell.

The six eggs in the row are then preferably—simultaneously pivoted into a generally horizontal position—i.e., with their respective longitudinal axes being generally horizontal—and gently lowered into a resting position on a supporting substrate 18. A tampon device 20 then descends against the side of the egg to transfer an ink image onto the upward-facing side of the eggshell. Preferably, six tampon devices simultaneously transfer a respective image to a respective one of the six eggs. The promotional images may be text, a logo, or any other artistic or graphic representation. The images may be single color or multicolor, requiring a single tampon or a sequence of tampons to contact each egg. Further, the six images may be the same or different from each other.

The tampon obtains the image from a cliche. As is known in the printing industry, a cliche is a steel or nylon plate into which the image to be transferred has been photoengraved or otherwise etched. The cliche is then inked and cleaned with a blade, leaving the ink in the etched areas only. The tampon, itself, is a flexible silicon pad that is pressed against the cliche so as to pick up the image from the cliche for transfer to the surface being imprinted. It should be recognized, of course, that the foregoing description is illustrative only, and that other materials can be used to construct the cliche and the tampon.

The conveyor is synchronized with the printing operation. After each row of eggs is imprinted, the conveyor advances so that the next row of eggs is positioned for further processing. For example, each egg may be imprinted by a respective second tampon to yield a two-color imprint. The eggs may then be advanced to a third printing station for contact by a respective third tampon to yield a three-color imprint, etc. Those skilled in the art will recognize that the eggs may alternatively be imprinted by multiple tampons at a single printing station without departing from the spirit of the invention.

As each row of imprinted eggs advances, it eventually reaches a position within the machine wherein the eggs in the row must be manipulated once again in order to print another area of the shell or to off-load the eggs into cartons for shipment. In either case, the eggs must either be manually manipulated or manipulated by a second vacuum head. A second vacuum head is preferably identical in structure to the first, and each head engages the side of a respective egg about the region that would be the upper region if the egg was vertically oriented. The row of eggs are accordingly pivoted into a vertical orientation by the vacuum heads and placed on the supporting substrate 22 of a second conveyor 24. It should be appreciated that the first and second substrates 18, 22 may be the same if the supporting egg-surfaces thereof are configured to support both horizontally and vertically oriented eggs, in which case the conveyors 14, 24 may also be a single conveyor.

As the eggs advance, they can be printed on the other side by conveying them to another vacuum head for appropriate manipulation and stamping by a tampon. Naturally, this manipulation and stamping can be carried out by vacuum head 11 and tampon 20 prior to advancing the matrix of eggs to the next row, so long as the ink of the first image has had time to dry before placing it in contact with a support surface for the second printing operation.

After the final printing operation, the rows of eggs are manipulated into a vertical position, either manually or by the vacuum heads, and placed in egg cartons for manual or automated off-loading.

In the preferred embodiment, a tampon holder holds multiple tampons, with each tampon being sized and positioned to contact a respective egg of the row being printed. It is preferable to utilize a tampon holder holding a matrix of tampons for simultaneously imprinting a like matrix of eggs, but separate tampons or tampons capable of imprinting more than one egg at a time can be used without departing from the scope of the invention.

The tampon itself is configured to soften the stamping impact on the egg. As illustrated in FIG. 2, each preferred tampon 20 comprises a generally cylindrical body 26 formed around a longitudinal axis 27 on an aluminum substrate 28. The body 26 preferably comprises 30% silicon rubber, 65% silicon oil and 5% catalyst. The body 26 preferably has a longitudinally-extending hollow central region 24 which is vented to the exterior of the body via aperture 30 in the substrate 28 to form a shock-absorbing air cell to enhance the softening of stamping impact on the eggshell. The body 26 is sufficiently pliant to conform to the contour of the eggshell for accurate reproduction of the image being printed, while sufficiently hard to accurately transfer the inked image efficiently.

The ink used for the imprinting process is a non-toxic variety of the type used to mark food products in the past. Once the ink's viscosity and color is selected, it is poured into the machine's ink container.

While the foregoing description includes detail that will enable those skilled in the art to practice the invention, it should be recognized that the description is illustrative in nature and that many modifications and variations will be apparent to those skilled in the art having the benefit of these teachings. For example, the eggs may be fed into the machine singly, in rows or in matrix sizes other than 5×6. The eggs may be manipulated and/or printed singly, or as a matrix.

Moreover, it should be recognized that the invention claimed herein is the use of eggs as a mass-distributable medium for promotional and informational purposes given its virtually universal acceptance and presence in homes throughout the world. This invention is not limited to the specific manner of imprinting eggs disclosed in the preferred embodiment, but includes imprinting by any other means as well, whether by laser printing, labels affixed to the eggshells or any other means utilizing eggs as the medium. The term "imprinting" as used herein shall be taken to include all printing methods whether printing is directly onto the eggshell or indirectly as on a label or other substrate affixed to the eggshell.

It is accordingly intended that the invention herein be defined solely by the claims to be appended to the completed patent application, and that the claims be interpreted as broadly as permitted in light of the prior art.

We claim:

1. A method for distributing promotional images comprising the steps of:
    imprinting mass quantities of eggs with a promotional image prior to distributing said eggs to consumers by imprinting the shells of rows of eggs with a row of printing tampons formed about respective longitudinal axes and having respective hollow interior portions; and
    permitting the hollow interior portions of at least some of said tampons to vent to a region exterior thereof to soften the stamping impact on the eggshell.

2. The method of claim 1 wherein the promotional image is selected from the group consisting of corporate logos, national flags, charitable insignias, messages, trademarks and service marks.

3. The method of claim 2 wherein the promotional images are multi-colored.

4. The method of claim 1 further including the steps of imprinting a matrix of eggs with a like matrix of the printing tampons.

5. The method of claim 1 including the steps of relatively orienting the row of eggs and the row of tampons so that the central axes of the eggs are substantially orthogonal to the direction of imprinting movement by the tampons.

6. The method of claim 5 wherein the orienting step includes the steps of lifting and manipulating a row of eggs with a substantially similar row of vacuum heads.

7. The method of claim 6 including the step of drawing a partial vacuum through orifices of said vacuum heads to secure each egg of the row against a respective head.

8. The method of claim 7 including the step of applying the partial vacuum through one or more orifices in the vacuum head so as to generally encircle the egg about an upper region whereby the egg is gently secured to the head with substantially evenly distributed pressure, enabling the egg to be spatially manipulated without cracking the shell.

9. The method of claim 8 including the step of generally simultaneously pivoting the eggs in the row so that their respective longitudinal axes are generally horizontal, and gently lowering the eggs in the row into a resting position on a supporting substrate.

10. The method of claim 9 including the step of moving the tampon into contact against the side of the egg to transfer an ink image onto the eggshell.

11. The method of claim 10 wherein the eggs are supported on a moving conveyor belt, and the conveyor is periodically stopped momentarily to permit the eggs of successive rows to be lifted and manipulated into position for contact by a respective tampon.

12. The method of claim 5 wherein the eggs are manually oriented.

13. The method of claim 12 wherein the eggs are supported on a moving conveyor belt, and the conveyor is periodically stopped momentarily to permit the eggs of successive rows to be lifted and manipulated into position for contact by a respective tampon.

\* \* \* \* \*